US008631078B2

(12) United States Patent
Wherry et al.

(10) Patent No.: US 8,631,078 B2
(45) Date of Patent: Jan. 14, 2014

(54) METHOD AND SYSTEM FOR EMBEDDED PERSONALIZED COMMUNICATION

(75) Inventors: Elaine Wherry, San Jose, CA (US); Sandy Jen, Menlo Park, CA (US); Seth Sternberg, San Francisco, CA (US); Jian Shen, E. Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/774,984

(22) Filed: Jul. 9, 2007

(65) Prior Publication Data

US 2008/0010344 A1 Jan. 10, 2008

Related U.S. Application Data

(60) Provisional application No. 60/819,441, filed on Jul. 7, 2006, provisional application No. 60/821,795, filed on Aug. 8, 2006.

(51) Int. Cl.
*G06F 15/16* (2006.01)

(52) U.S. Cl.
USPC .......................................... 709/206; 709/207

(58) Field of Classification Search
USPC .................. 709/204, 206, 207, 224
See application file for complete search history.

(56) References Cited

U.S. PATENT DOCUMENTS

| 6,912,564 | B1 * | 6/2005 | Appelman et al. ............. 709/204 |
| 7,124,123 | B1 | 10/2006 | Roskind et al. |
| 7,130,885 | B2 * | 10/2006 | Chandra et al. ............... 709/206 |
| 7,165,213 | B1 * | 1/2007 | Busey ............................. 715/205 |
| 7,171,473 | B1 * | 1/2007 | Eftis et al. ..................... 709/227 |
| 7,263,526 | B1 | 8/2007 | Busey et al. |
| 7,822,821 | B2 | 10/2010 | Foote |
| 7,853,881 | B1 | 12/2010 | Assal et al. |
| 2002/0029248 | A1 * | 3/2002 | Cook et al. .................... 709/206 |
| 2002/0087704 | A1 * | 7/2002 | Chesnais et al. .............. 709/228 |
| 2002/0116458 | A1 * | 8/2002 | Bricklin et al. ............... 709/204 |
| 2003/0018726 | A1 * | 1/2003 | Low et al. ..................... 709/206 |
| 2003/0126213 | A1 * | 7/2003 | Betzler ......................... 709/206 |
| 2003/0225846 | A1 * | 12/2003 | Heikes et al. ................. 709/207 |
| 2003/0225848 | A1 * | 12/2003 | Heikes et al. ................. 709/207 |
| 2004/0148356 | A1 * | 7/2004 | Bishop et al. ................. 709/206 |
| 2004/0172456 | A1 * | 9/2004 | Green et al. .................. 709/207 |
| 2005/0065935 | A1 * | 3/2005 | Chebolu et al. .................. 707/9 |
| 2005/0102358 | A1 * | 5/2005 | Gold et al. .................... 709/204 |

(Continued)

FOREIGN PATENT DOCUMENTS

WO WO 2008/019350 A2 2/2008

OTHER PUBLICATIONS

US07/73081, Meebo, Inc.—PCT Serch Report and Written Opinion, Jun. 20, 2008.

(Continued)

*Primary Examiner* — Gerald Smarth
(74) *Attorney, Agent, or Firm* — Patent Law Works LLP

(57) ABSTRACT

A method and system for embedded personalized communication have been disclosed. According to one embodiment, a computer-implemented method comprises providing software code to be embedded in a webpage. The webpage is loaded including the software code. A configuration file is fetched from a configuration server in response to the software code. A first instant messaging user interface is rendered on the webpage. A request is sent to a web-based instant messaging server, the request initiating an instant messaging session with a second instant messaging user interface.

38 Claims, 4 Drawing Sheets

(56) References Cited

U.S. PATENT DOCUMENTS

| | | | |
|---|---|---|---|
| 2005/0188076 A1* | 8/2005 | Rayburn et al. | 709/224 |
| 2005/0262185 A1 | 11/2005 | Beartusk et al. | |
| 2005/0273382 A1* | 12/2005 | Beartusk et al. | 705/12 |
| 2006/0031234 A1* | 2/2006 | Beartusk et al. | 707/100 |
| 2006/0045124 A1* | 3/2006 | Dahlstrom et al. | 370/465 |
| 2006/0221173 A1 | 10/2006 | Duncan | |
| 2007/0271136 A1 | 11/2007 | Strauss et al. | |
| 2007/0282963 A1* | 12/2007 | Mo et al. | 709/207 |
| 2008/0028323 A1 | 1/2008 | Rosen et al. | |
| 2008/0034040 A1 | 2/2008 | Wherry et al. | |
| 2008/0065732 A1 | 3/2008 | Kulkarni et al. | |
| 2010/0107088 A1 | 4/2010 | Hunt et al. | |

OTHER PUBLICATIONS

Office Action dated Apr. 2, 2009 Germany Patent Appl. 11 2007 001 516, English and German translations.

Facebook Developer Wiki, "Facebook Connect—From Facebook Developer Wiki—Welcome to Facebook Connect," page last modified Jan. 29, 2010, printed on Feb. 16, 2010, 7 pages, at URL: http:wiki.developers.facebook.com/index.php/Facebook_Connect.

"Facebook Chat. Everywhere. Chat with your Facebook friends right from your desktop." Copyright 2010, printed on Feb. 16, 2010, 5 pages, at URL: http://www.facebook.com/sitetour/chat.php.

http://www/freejavachat.com, May 20, 2004, 3 pages, archive at: http://web.archive.org/web/20040611120428/www.freejavachat.com/setup.html.

"Jabber Messenger™ for the Web is a zero-footprint instant messaging (IM) client. It provides rapid deployment for standards-based, secure IM and other presence services without having to touch every desktop." Copyright 2007-2008, printed on Feb. 16, 2010, 3 pages, at URL:http://www.jabber.com/CE/JabberMessengerfortheweb.

"JabberMomentIM™—Jabber, Inc.'s AIM® certified, Windows desktop client—has generated a lot of excitement due to its combination of responsiveness, extensibility, and robust enterprise instant messaging (EIM) functionality. This brandable, feature-rich, and programmable EIM client is designed to work with the industry leading Jabber Extensible Communications Platform™ (Jabber XCP™)," Copyright 2007-2008, printed on Feb. 16, 2010, 4 pages, at URL: http://www.jabber.com/CE/JabberMomentIM.

Jabber XCP Product Information, printed on Feb. 16, 2010, Copyright 2008, pp. 1-16, at URL: http://www.jabber.com/media/Jabber_XCP.pdf.

International Preliminary Report on Patentability for Application No. PCT/US07/073081, dated Jan. 22, 2009, 4 pages.

International Search Report of the International Searching Authority for Application No. PCT/US07/075296, mailed on Jul. 7, 2008, 1 page.

Written Opinion of the International Searching Authority for Application No. PCT/US07/075296, mailed on Jul. 7, 2008, 5 pages.

International Preliminary Report on Patentability for Application No. PCT/US07/075296, mailed on Feb. 10, 2009, 6 pages.

Non-Final Office Action for U.S. Appl. No. 11/834,562, mailed on May 30, 2008, 12 pages.

Final Office Action for U.S. Appl. No. 11/834,562, mailed on Mar. 12, 2009, 13 pages.

Non-Final Office Action for U.S. Appl. No. 12/606,946, mailed on Dec. 23, 2011, 10 pages.

* cited by examiner

METHOD AND SYSTEM FOR EMBEDDED PERSONALIZED COMMUNICATION

The present application claims the benefit of and priority to U.S. Provisional Patent Application No. 60/819,441 entitled "A Method and System for Embedded Personalized Communication" and filed on Jul. 7, 2006, and is hereby, incorporated by reference. The present application further claims the benefit of and priority to U.S. Provisional Patent Application No. 60/821,795 entitled "A Method and System for Embedded Personalized Communication" and filed on Aug. 8, 2006, and is hereby, incorporated by reference.

TECHNICAL FIELD

The field of the invention relates generally to computer systems and more particularly relates to a method and system for embedded personalized communication.

BACKGROUND

Instant Messaging (sometimes referred to as IM) enables users to easily see whether a chosen buddy (e.g., a friend, colleague, co-worker or the like) is connected to the Internet and, if so, to exchange messages with them. Instant Messaging differs from common e-mail in the immediacy of the message exchange. Typically, IM exchanges are text-only. However, some services (e.g., AOL Instant Messaging) enable voice messaging and file sharing. In IM, both users need to subscribe to the service (e.g., and have certain software on their user devices), and need to be online at the same time. In addition, the intended recipient needs to be willing to accept instant messages. If one tries to send an IM to someone who is not online, or who is not willing to accept an Instant Message, a notification is typically provided that the transmission cannot be completed. If the recipient's online software is set to accept Instant Messages, it typically alerts the recipient with a distinctive sound and displays a Pop-Up window that indicates that an IM has arrived, and that enables the recipient to accept or reject it, or displays a Pop-up window containing the incoming message. In general, IM can be truly or virtually instantaneous (with, e.g., delays of usually less than a number of seconds), such that it is typically possible for two people to have a real-time online "conversation" by sending IMs to each other.

IM users typically use a networked computer and IM client software to exchange messages with one another in conversational style. An IM client provides an interface for users to compose, send, receive, and read text messages. Examples of IM clients that are popular today include IBM's SAMETIME, MSN MESSENGER, YAHOO! INSTANT MESSENGER, and AOL INSTANT MESSENGER.

In a graphical display, an IM client provides windows through which a user can compose and read messages. IM clients provide users the ability to manage lists of contacts, particularly other IM users. These lists are referred to as "buddy lists." Users may organize buddy lists into groups of related users, where the IM client displays the various groups in a hierarchical tree that can be collapsed and expanded as the user desires.

SUMMARY

A method and system for embedded personalized communication are disclosed. According to one embodiment, a computer-implemented method comprises providing software code to be embedded in a webpage. The webpage is loaded including the embedded software code. A configuration file is fetched from a configuration server in response to the loading or activation of the embedded software code. Using the configuration file contents, an initial instant messaging user interface is rendered on the webpage. The software code sends a request to a web-based instant messaging server to initiate a session. Once communication is established and the session is initiated, the instant messaging user interface is updated. Using an event-based communication system, events and messages can be exchanged between the software code and the instant messaging server until the session is closed. Input from a visitor of the webpage can be facilitated through the embedded software code's instant messaging user interface rendered on the webpage.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for embedded personalized communication are disclosed. According to one embodiment, a computer-implemented method comprises providing software code to be embedded in a webpage. The webpage is loaded including the embedded software code. A configuration file is fetched from a configuration server in response to the loading or activation of the embedded software code. Using the configuration file contents, an initial messaging user interface is rendered on the webpage. The software code sends a request to a web-based instant messaging server to initiate a session. Once communication is established and the session is initiated, the instant messaging session user interface is updated. Events and messages can be exchanged between the software code and the instant messaging server until the session is closed. Input from a visitor of the webpage can be facilitated through the embedded software code's instant messaging user interface rendered on the webpage.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
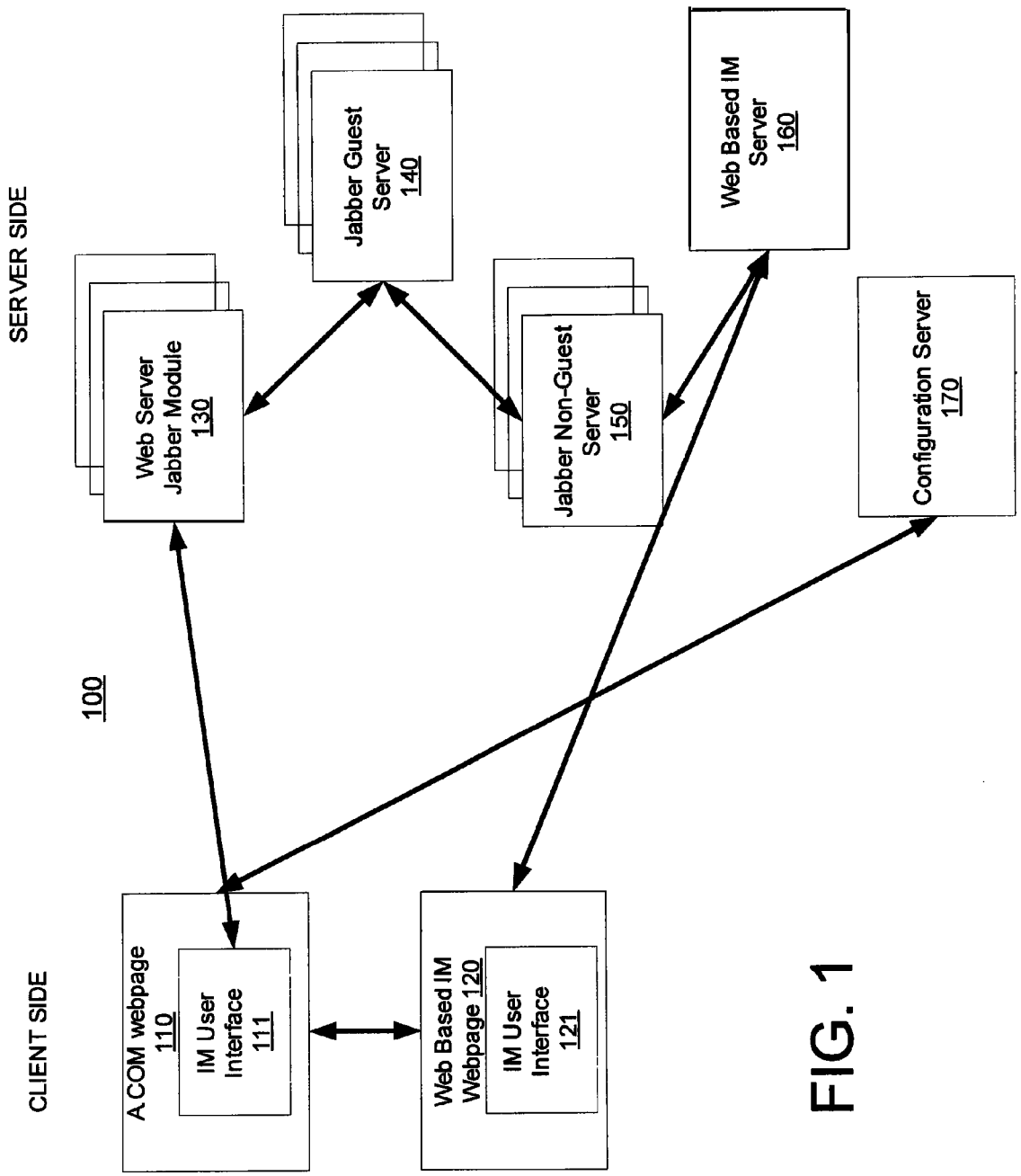
FIG. 1 illustrates a block diagram of an exemplary peer-to-peer messaging system with embedded personalized communication, according to one embodiment.

FIG. 1 illustrates a block diagram of an exemplary system 100 for embedded personalized communication, according to one embodiment. Embedded personalized communication refers to any messaging capability that allows communication between an origin server and a software module replicated or embedded on multiple servers (or websites). System 100 also allows for the determination of a user's web presence, that is identifying the website that a user is visiting on the web and/or the activities, behavior, or other information related to that user while the user is on that site.

Embedded communications system 100 is divided into a client side and a server side. The client side includes webpage A.COM that may be accessible through a web browser. Webpage A.COM includes embedded code to allow an instant messaging interface 111 to be replicated within the webpage A.COM 110. Instant messaging interface 111 can be a replica or variation of instant message user interface 121 hosted on a webpage for web based IM 120. It is important to note that instant messaging interface 111 allows users visiting webpage A.COM to instant message, receive presence information, or exchange other similar information with a user of web based IM client 120 in real time. For example, webpage A.COM 110 may be user A's profile on MYSPACE.COM. User A's profile is typically rendered by a browser in HTML format which contains the embedded code that links webpage A.COM of client 110 to his/her instant messaging account as viewed on webpage for web based IM of client 120 (for example, on MEEBO.COM). Through this link, a user on visiting webpage A.COM 110 can initiate, receive, and maintain a one-on-one chat session with the user on web based IM webpage client 120.

Instant message user interface 111 is only a replica of instant message user interface 121 in that the communications between both interfaces are synchronized and dynamically updated in real-time. Each interface may have its own look and feel, design, etc.

The server side of embedded communications system 100 communicates with webpage A.COM on client 110 and webpage web-based IM on client 120. According to one embodiment, web server 130 is a LightTPD web server. LightTPD is a web server which is designed to be secure, fast, standards-compliant, and flexible while being optimized for speed-critical environments. Its low memory footprint (compared to other web servers), light CPU load and its speed goals make LightTPD suitable for servers that are suffering load problems, or for serving static media separately from dynamic content. LightTPD is free software/open source, and runs on GNU/Linux and other Unix-like operating systems and Microsoft Windows.

Web server 130 includes a Jabber module that communicates with a guest server 140. Jabber is an instant messaging and presence technology that utilizes the Extensible Messaging and Presence Protocol (XMPP). In one embodiment, web server 130 communicates with a Jabber guest server 140. Jabber guest server 140 can be instantiated on the same physical server at web server 130, or a separate one altogether. Jabber guest server 140 maintains a database of active IM clients and includes the capability of offering anonymous subscriptions when requested by web server 130. Jabber guest server 140 may also be queried for presence information of subscribed users.

A non-guest Jabber server 150 communicates with Jabber guest server 140. Jabber non-guest server 150 facilitates instant messaging communication when users are not anonymous. In other words, Jabber non-guest server 150 communicates with web based IM server 160 that maintains databases of registered users that have instant messaging accounts, such as the webpage for web based IM client 120.

The functionality ascribed to Jabber guest server 140 can also live on Jabber non-guest server 150 and vice versa. In another embodiment, anonymous and registered users could both communicate with the same Jabber server. Communication between anonymous and registered users occurs between the different instantiations on the same server.

Web based IM server 160 allows clients to log in to multiple accounts on multiple instant messaging (IM) networks simultaneously. This means that one can be chatting with friends on AOL Instant Messenger, talking to a friend on Yahoo Messenger, and sitting in an IRC channel all at the same time, and through a common web interface.

In this embodiment, all registered users of IM server 160 are also logged into Jabber non-guest server 150. When a registered user logs into their account on web server 160, server 160 initiates an IM session with Jabber non-guest server 150, using credentials stored in the database system controlled by IM system 160. For the life of the session on IM user interface 121, web server 160 attempts to keep the user logged into Jabber non-guest server 150. On a potential disconnection, the user is automatically re-connected.

A configuration server 170 stores configuration files that are used to instantiate properties of instant message user interface 111, e.g. rendering, communication details, server-specific information, etc., as well as to uniquely identify or categorize instances of the instant message user interface 111 embedded on multiple webpages 110. The HTML code for the instant message user interface 111 specifies which configuration file to load from the configuration server 170. That configuration file stores an identifier chosen by the creator of the embedded instant message user interface 111 so that when a new message is received, the user can immediately recognize the origin of the visitor. This organization of conversations is done through the user's buddylist where specific conversation instances are listed under their respective identifiers or "groups" that were chosen during creation.

System 100 is interconnected by the Internet (not shown), alternatively, the network may be a Wide Area Network (WAN), a Local Area Network (LAN), or any other system of interconnections enabling two or more devices to exchange information. Further, the network may include a wireless network, such that one or more of clients 110 or 120 may be wireless devices.

One or more of clients 110 or 120 may allow network access via a web browser such as MICROSOFT'S INTERNET EXPLORER, NETSCAPE BROWSER, MOZILLA, FIREFOX, or the SAFARI browsers that support HTML and JavaScript. Additionally, clients 110 or 120 may be mobile devices, such as videophones, laptops, smart phones, mobile phones, PDAs, game devices such as the PSP manufactured by Sony Electronics, multimedia devices such as iPods and iPhones manufactured by Apple Computers of Cupertino, Calif., or similar devices.

According to one embodiment, server 160 may be a Gaim server such as an open-source GTK2-based instant messenger application (under GPL). It supports multiple protocols via modules, including AIM, ICQ, Yahoo!, MSN, Jabber, IRC, Napster, Gadu-Gadu and Zephyr.

Servers 130-170 run on a number of platforms, including Windows, Linux, and Qtopia (Sharp, Zaurus and iPaq). Gaim server 160 is not endorsed by or affiliated with AOL Time-Warner, Microsoft, or Yahoo. Although Gaim server 160 is described, any multi-protocol server may be used including Pidgin (open source) or Trillian created by Cerulean Studios. According to one embodiment, Gaim server 160 does not include the GTK visual software in order to be optimized as a web server application. In one embodiment, the Gaim server 160 is comprised mostly of back-end functionality and no graphical user interface. Different systems may set limits on how many instant messaging services may be connected, or may be active on one screen.

The processes executed within system 100 may be implemented in software or hardware, or utilizing a device that is, or can be, connected to a common network, such as the Internet. Clients 110, and 120 may be mobile devices or fixed devices such as set top boxes, desktop computers, media recorders such as those manufactured by TiVo, Inc. of Alviso, Calif., game devices such as the XBox manufactured by Microsoft, Corp. of Redmond, Wash. or similar devices.

Web based IM server 160 enables a web based instant messaging service for clients 110, and 120 that does not require IM software to be installed on clients 110, and 120. According to one embodiment, the instant messaging application is web-based and communication between clients 110, 120 and servers 130-170 take the form of XmlHttpRequests.

Servers 130-170 are web servers that use any one of a number of protocols and/or applications including HyperText Transfer Protocol (HTTP), File Transfer Protocol (FTP), Internet Relay Chat (IRC), etc., via a TCP/IP connection (not shown in this view) or other similar connection protocols. The operating system may be Windows®, LINUX, SUN Solaris®, Mac OS, Tiger, or other similar operating system. In one embodiment, the servers 130-170 are dedicated servers. It uses processing logic, tools and databases and is built using a combination of technologies such as those from Apache Software (www.apache.org) such as Tomcat servers; Java based technologies such as J2EE, EJB, JBOSS, JDBC; and/or databases such as MySQL.

System 100 may also include other supporting computing software and hardware, for example, additional website servers, databases, computers, and user interface servers.

Figure 2:
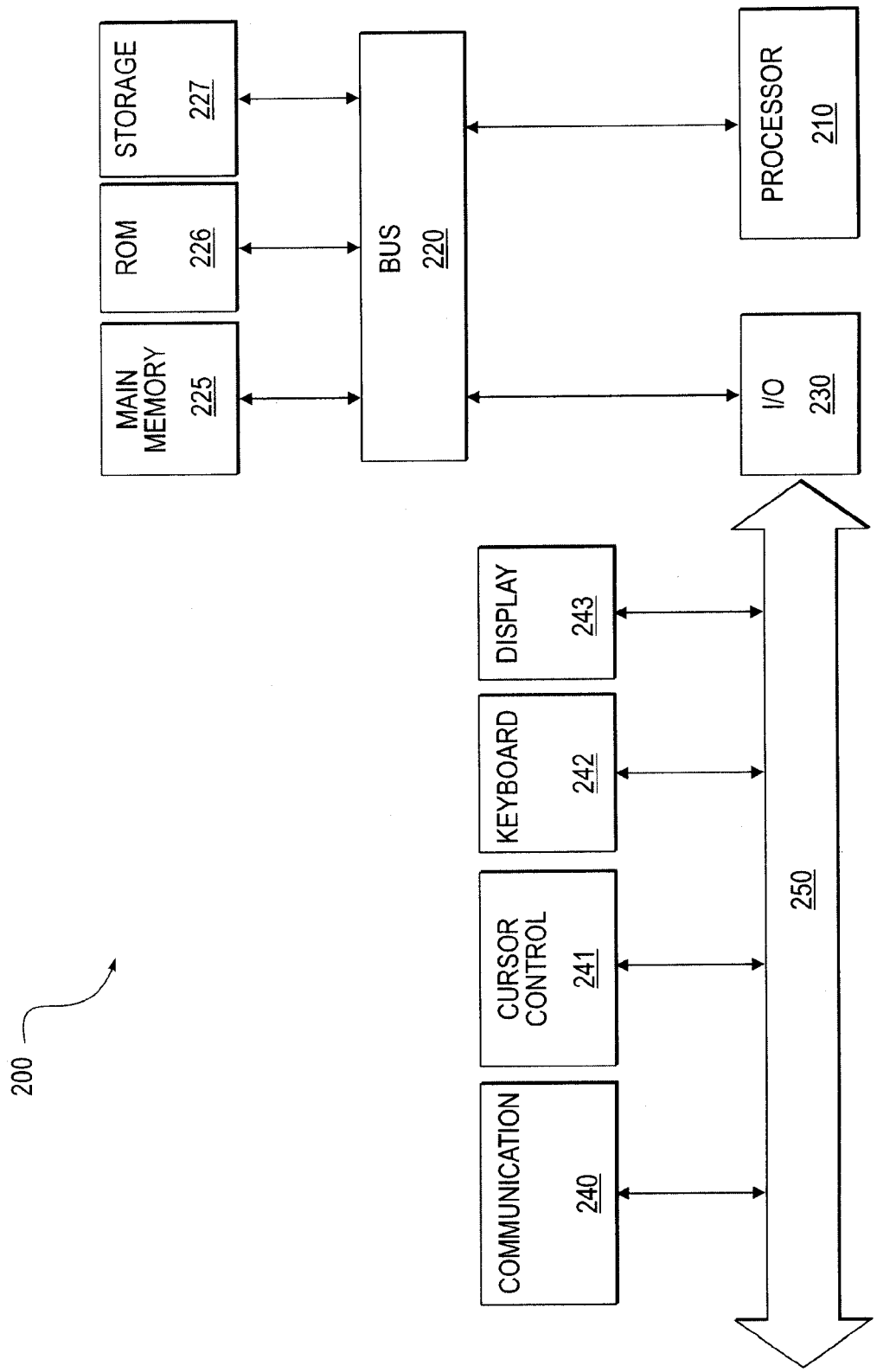
FIG. 2 illustrates an exemplary computer architecture for use with the present system, according to one embodiment.

FIG. 2 illustrates an exemplary computer architecture for use with the present system, according to one embodiment. Computer architecture 200 can be used to implement a client 110, 120, or a server 130-170 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, web pages rendered by MMSW server 130 and related information may be presented to the user on the display device 243.

The communication device 240 allows for access to other computers (servers or clients) via a network. The communication device 240 may comprise a modem, a network interface card, a wireless network interface or other well known interface device, such as those used for coupling to Ethernet, token ring, or other types of networks.

Figure 3:
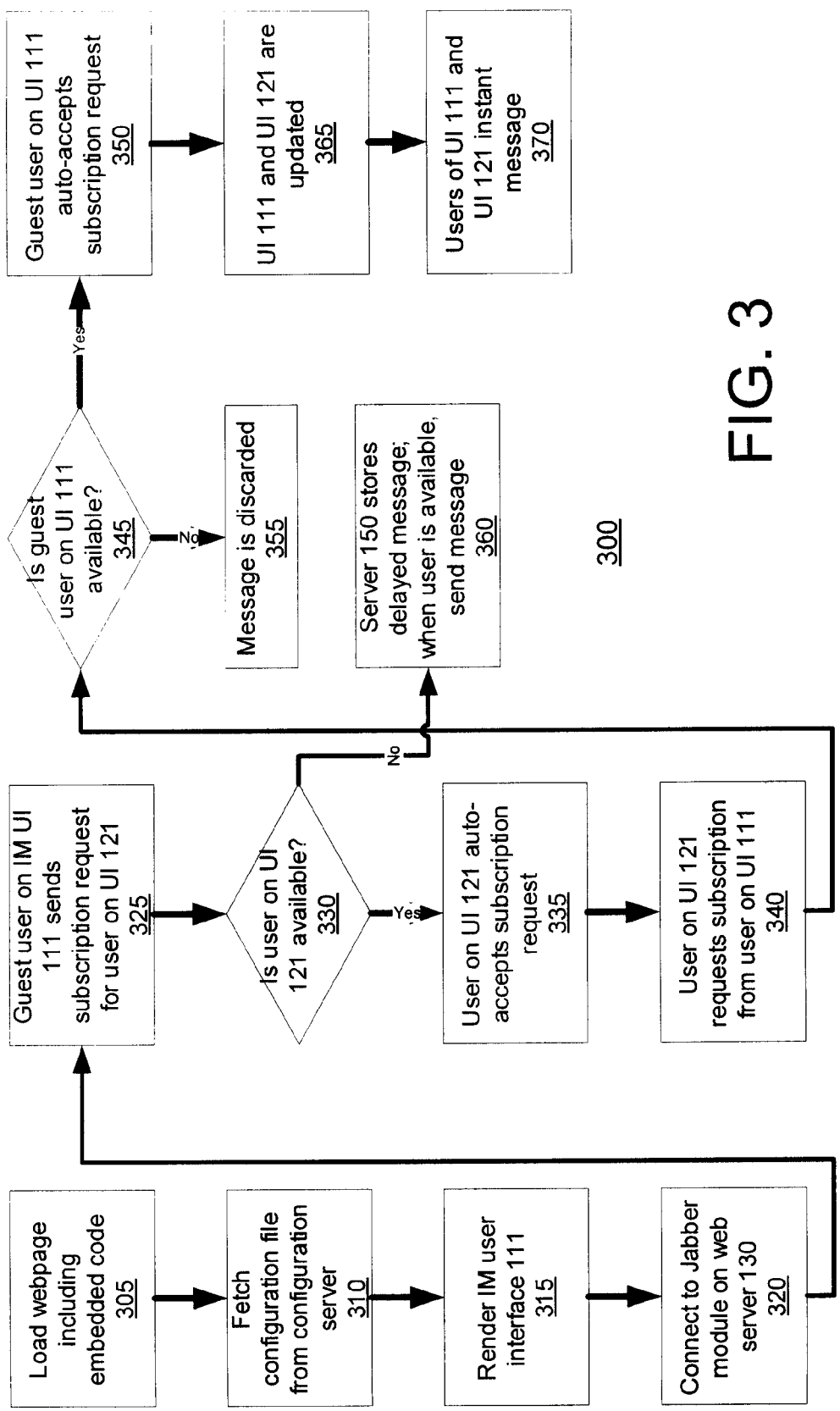
FIG. 3 illustrates a flow diagram of an exemplary process for embedded personalized communication, according to one embodiment.

FIG. 3 illustrates a flow diagram of an exemplary process 300 for embedded personalized communications, according to one embodiment. When a user visits the webpage A.COM on client 110, the software module embedded on the webpage (the widget) is loaded. (305) Depending on the user's browser, the widget can be automatically loaded when the webpage is loaded or the visitor of the webpage must activate it. Activation can be accomplished by clicking on the rendering of the widget on the webpage 110, scrolling to the webpage so that the widget comes into physical view, etc. The widget instructs the client 110 to fetch a configuration file from the configuration server 170. (310) The configuration file identifies the user associated with the widget and ostensibly A.COM (for example, the user whose profile is on MYSPACE.COM is most likely the same user who placed the embedded widget code on A.COM), visual preferences for the user, title, alias, and other information that the widget might need for instantiation. With the information read from the configuration file, an instant messenger user interface 111 is rendered on A.COM 110 having a particular title, color scheme, and a presence or status element indicating information about the owner of the widget (set to offline as a default). (315)

Client 110 connects to the Jabber module of web server 130. (320) The user of client 110 requests that a session be initiated from server 130 as an anonymous guest. Server 130 logs in the anonymous guest to Jabber guest server 140. Jabber guest server 140 initiates an IM session and communicates back to web server 130 that the anonymous guest is online. A.COM web server's Jabber module 130 appears to Jabber guest server 140 as a guest Jabber user, e.g. a client of Jabber guest server 140.

Instant message user interface 111 sends a subscription request message through A.COM web server 130 to Jabber guest server 140, to request permission to receive the presence information of the user associated with the A.COM webpage. (325) A decision is made to determine if the user of IM user interface 121 is available. (330) If the user is available on instant message user interface 121, the IM session associated with that user on web server 160 automatically accepts the subscription request. (335) Web server 160 then responds with an identical subscription request for the guest Jabber user's presence information on Jabber guest server 140. (340) A decision is made to determine if the user of IM user interface 111 is available. (345) The Jabber module on web server 130 also automatically accepts the request on behalf of the user on A.COM. (350) Thusly, both ends of the communication scheme can now receive presence (and related) information about each other. The IM session has now been established and the interfaces update to reflect the connected state. (365) Both users can initiate instant message communications. (370).

In another embodiment, if the user is available on instant message user interface 121, instead of automatically accepting subscription requests, the user on interface 121 can receive a prompt to add the user of interface 111 to an instant messaging session and, thus be subscribed to presence information. The user on interface 121 may also be asked to add the user on interface 111 to his/her buddy list.

Servers 130 and 160 update their respective user interfaces 111, 121 to indicate that the users are both available. Real time status of each user is maintained. For example, if the user on interface 121 sets his status as "away" and includes a custom away message, user interface 111 is updated to show the "away" status and the associated message. (360) User interface 121 also indicates that the other user is using the widget associated with a particular identity. This identity can be a category (e.g. "Social networking widget") as specified by data read in from the configuration file. The identity could also indicate the webpage (e.g. A.COM) where the widget is embedded. This could be done using the configuration file, running a CGI script located on another web server that responds with the containing web page, or another implementation that accurately returns the embedded webpage.

If the user on webpage A.COM leaves the instant message session without explicitly closing the session (e.g. close the browser, leave the webpage, etc), after a pre-set timeout (e.g. 45 seconds in one embodiment), the server 130 assumes the connection to client 110 is lost. The connection can be reestablished as described above. If the webpage on A.COM 110 is reloaded, if an instant message session was already established, it will be terminated and restarted, according to process 300.

If the user on webpage A.COM attempts to contact user of IM user interface 121, but the user of IM user interface 121 is not logged in, the user on webpage A.COM may still send a message. This message can include the initial subscription request. The message will be stored on the Jabber non-guest server 150 and then served to the user once he/she logs in. (360) In the case of a cached and delayed subscription request, IM server 160 still automatically accepts the request once the user is logged into interface 121. Before this occurs, the visitor on user interface 111 sees the widget owner as offline; once the subscription handshake (described above) is completed, the interface 111 is updated to reflect the widget owner's new status. If the delayed message is in the form of an instant message, the user on interface 121 can respond if the Jabber user on interface 111 is still available and present on the webpage 110.

In one embodiment, messages sent from the registered Jabber user on web server 160 using interface 121 to the guest Jabber user on interface 111 are discarded if the guest user has terminated the session before the message is received. (355)

The user of the widget may terminate the connection at any time by clicking on a disconnection IM user interface 111. This effectively removes all presence subscriptions from both sides and closes the network connection thus ending the conversation and terminating future notifications of presence on both sides. To both parties, the other party appears offline. This allows visitors to a web page 110 the ability to ignore the owner of the widget in the event of unwanted conversation or a desire to browse the page anonymously. The widget remembers the visitor's preference for that instance so that repeated returns to the web page 110 containing the widget 111 will remain disabled or enabled based on the visitor's last preference with the disconnect button.

In one embodiment, the visitor's preference can apply to all widgets 111 on all web pages 110 and not a specific instance. This preference is stored on the client side in a cookie.

The widget at client 110 may also track the time that a user is visiting webpage A.COM and send that information to the user on IM user interface 121. The session length and similar information may be stored at server 160 for analysis and generation of metrics (including advertising metrics).

A cookie may be stored on client 110 to track the frequency with which client 110 logs into A.COM. The cookie may also be used to store an alias for the user using client 110. A hash algorithm may also be used to assign a unique identifier to the client 110 that is stored on web based IM server 160. Additionally, if a user opens additional browsing panes or windows, IM sessions that have been established are not dropped.

The owner of the widget using the web based IM webpage 120 has the ability to see all connected widgets from the buddy list and, in one action, has the ability to broadcast a message to all users connected to widgets in real time via a simple input on the IM user interface 121. Those broadcast messages are interpreted by the widget of webpage 110 and reflected in the user interface 111. The reflections in the user interface 111 of the widget are not limited to purely text content but can be a change in the visual layout of the interface 111 such as a picture or icon denoting the person's current status or the playing of a sound file to alert the visitor of a change.

In one embodiment, the user on A.COM may voluntary close the session using interface 111, thus terminating the IM session. The status of the guest Jabber user is then updated in user interface 121. If the web page is not reloaded and the guest user establishes a new session, the same guest account is used by web server 130 (and Jabber guest server 140) and therefore the user interface 121 treats the presence information as coming from the same user.

In another embodiment, the same temporary guest Jabber user account is used despite page movement or reloading by the visitor to A.COM 110. Users of interface 111 can browse sub-pages of a webpage 110 while maintaining their connection to web server 130. The user interface 121 of the widget owner on Jabber non-guest server 140 might display information about their browsing behavior or other related information. One way this could be achieved is by storing the visitor's configuration credentials in a cookie or another browser storage related method. Another embodiment might involve communication with the servers of A.COM to store session information.

Figure 4:
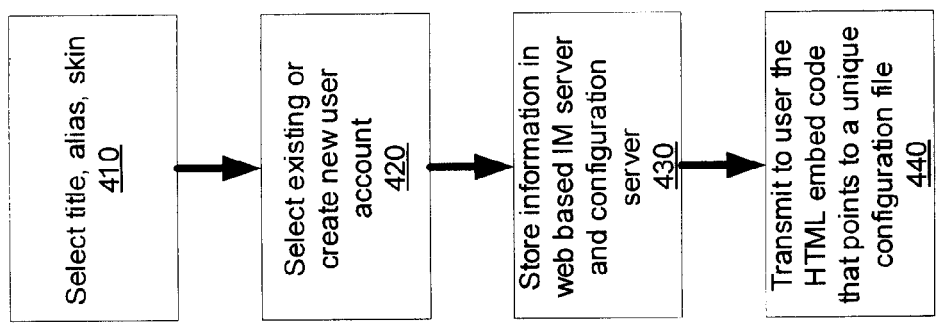
FIG. 4 illustrates a flow diagram of an exemplary process to create embedded code, according to one embodiment.

FIG. 4 illustrates a flow diagram of an exemplary process 400 to create embedded code, according to one embodiment. Creation process 400 allows an owner of a webpage (such as webpage of A.COM 110) to insert embedded code within the webpage to enable IM user interface 111. Through web based IM server 160, a user is prompted to select design parameters for the IM user interface 111, such as a title, alias, user interface location, and skin. (410) The user is then prompted to choose an existing or create a new user account on web based IM server 160. (420) Web based IM server 160 stores the user provided design parameters, as well as any user profile information. Those parameters necessary for the instantiation of interface 111 are stored in a configuration file on a configuration server 170, which can be separate from web server 160. (430) Web based IM server 160 automatically generates code that is embedded within the HTML code for generating A.COM webpage 110, such that IM user interface 111 is generated with the A.COM webpage 110 when A.COM is loaded. (440) The embedded code points to a configuration file stored in configuration server 170, where the configuration file stores the design parameters selected by the owner. These configuration parameters may be modified using user interface 121 or some other web page associated with the user account that designed the embedded code.

The software code may be an embedded Flash, JavaScript, a browser plug-in, or a Java routine. One such Flash embodiment includes using the LocalConnection Objects in Flash to interact between SWF files. The LocalConnection class allows sending and receiving of data from one SWF to another across sites. Cross-domain communication is enabled through commands such as LocalConnection.allow-Domain( ). Sites that include this Flash script communicates with the intended domain to transfer information.

A JavaScript embodiment includes dynamically embedding a script tag on a page. By dynamically inserting a script tag on a page, the JavaScript is run immediately. The script tag references scripts on other sites. To facilitate communication between the dynamically embedded script and the other domain, the included script outputs a JSON (or any other predetermined format) response to the data contained in the URL of the script tag.

A third embodiment includes a downloaded and installed software application, like a browser plug-in, where the installed application affords a greater range of functionality than a stand-alone browser normally allows. The application is an installed extension of the browser like a Mozilla Add-on, or a separate application altogether. Once a user installs such a plug-in or similar application, the installed software has the ability to detect what website a user is browsing and communicate that and similar information to back-end server 150 via a protocol like HTTP or a connection using another type of Internet protocol.

Another embodiment involves embedding a small program, perhaps in Java, called an applet onto pages served by website server 170 using the <applet> tag. The applet is downloaded every time the user visits the page and the code is executed by software on the user's computer, which can be the Java Virtual Machine, etc. When the code is executed, the applet is able to garner pertinent information which can then be communicated back to back-end server 150 via HTTP or another Internet protocol.

The user of A.COM's webpage may have his/her presence known in many ways. For example, an icon for a popular website may appear next to the user's name on user of IM user interface 121, such as a "Y!" for "Yahoo." It may also show the name of a website in its usually known name, such as "Yahoo," or by a hyperlink www.yahoo.com which may appear when a mouse pointer moves over an icon. The user of IM user interface 121 may receive an e-mail, instant message, text message or other method of notification of user of IM user interface 111's web presence. A user may choose one or more ways to notify another user his/her web presence. A user may choose one or more ways to be notified of another user's web presence.

A method and system for embedded personalized communication have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:
1. A computer-implemented method, comprising:
loading a webpage including software code embedded in the webpage, the software code including data describing a location in a configuration server that stores a configuration file;
fetching, based at least in part on the location included in the software code, the configuration file that includes one or more design parameters from the configuration server in response to the software code being executed due to loading of the webpage, the one or more design parameters including data for generating a presence element that indicates a status of an owner of a widget related to a first instant messaging user interface;
rendering the first instant messaging user interface on the webpage using the fetched configuration file;
allowing communications between the first instant messaging user interface and a first server having an instant messaging gateway service;
sending first instructions from the first server to a second server, the first instructions establishing an anonymous instant messenger account for a first user using the first instant messaging user interface;
sending a request to a web-based instant messaging server, the request initiating an instant messaging session with a second instant messaging user interface, the request requiring a permission to receive presence information of the first user using the first instant messaging user interface;
determining if a second user is using the second instant messaging user interface;
responsive to determining that the second user is using the second instant messaging user interface, sending a prompt to the second user to respond to the request; and
assigning a unique identifier to the first client using a hash algorithm, the unique identifier stored on the web-based instant messaging server.

2. The computer-implemented method of claim 1, further comprising determining if a second user is using the second instant messaging user interface.

3. The computer-implemented method of claim 2, further comprising prompting the second user to respond to the request.

4. The computer-implemented method of claim 3, wherein the first server and the second server communicate to maintain a real-time instant messaging session between the first user and the second user.

5. The computer-implemented method of claim 4, wherein status information for the first user and the second user is dynamically updated.

6. The computer-implemented method of claim 4, wherein the second instant messaging user interface indicates a location of the first instant messaging user interface on a network.

7. The computer-implemented method of claim 2, wherein the first instant messaging user interface is designed by the second user.

8. The computer-implemented method of claim 2, wherein the software code is automatically generated in response to the one or more design parameters provided by the second user.

9. A non-transitory computer-readable storage medium having stored thereon a plurality of instructions, said plurality of instructions when executed by a computer, cause said computer to perform:
  loading a webpage including software code embedded in the webpage, the software code including data describing a location in a configuration server that stores a configuration file;
  fetching, based at least in part on the location included in the software code, the configuration file that includes one or more design parameters from the configuration server in response to the software code being executed due to loading of the webpage, the one or more design parameters including data for generating a presence element that indicates a status of an owner of a widget related to a first instant messaging user interface;
  rendering the first instant messaging user interface on the webpage using the fetched configuration file;
  allowing communications between the first instant messaging user interface and a first server having an instant messaging gateway service;
  sending first instructions from the first server to a second server, the first instructions establishing an anonymous instant messenger account for a first user using the first instant messaging user interface; and
  sending a request to a web-based instant messaging server, the request initiating an instant messaging session with a second instant messaging user interface, the request requiring a permission to receive presence information of the first user using the first instant messaging user interface;
  determining if a second user is using the second instant messaging user interface;
  responsive to determining that the second user is using the second instant messaging user interface, sending a prompt to the second user to respond to the request; and
  assigning a unique identifier to the first client using a hash algorithm, the unique identifier stored on the web-based instant messaging server.

10. The non-transitory computer-readable storage medium of claim 9, having stored thereon-additional instructions, said additional instructions when executed by the computer, cause said computer to further perform determining if a second user is using the second instant messaging user interface.

11. The non-transitory computer-readable storage medium of claim 10, having stored thereon-additional instructions, said additional instructions when executed by the computer, cause said computer to further perform prompting the second user to respond to the request.

12. The non-transitory computer-readable storage medium of claim 11, wherein the first server and the second server communicate to maintain a real-time instant messaging session between the first user and the second user.

13. The non-transitory computer-readable storage medium of claim 12, wherein status information for the first user and the second user is dynamically updated.

14. The non-transitory computer-readable storage medium of claim 12, wherein the second instant messaging user interface indicates a location of the first instant messaging user interface on a network.

15. The non-transitory computer-readable storage medium of claim 10, wherein the first instant messaging user interface is designed by the second user.

16. The non-transitory computer-readable storage medium of claim 10, wherein the software code is automatically generated in response to the one or more design parameters provided by the second user.

17. A system comprising:
  one or more processors; and
  an output module, stored on a memory and executable by the one or more processors;
  wherein the one or more processors is configured to:
  load a webpage and software code embedded in the webpage, the software code including data describing a location in a server that stores a configuration file;
  fetch, based at least in part on the location included in the software code, the configuration file that includes one or more design parameters as a result of execution of the software code due to loading the webpage, the one or more design parameters including data for generating a presence element that indicates a status of an owner of a widget related to a first instant messaging user interface;
  cause the webpage to be rendered on the output device; and
  cause, using the fetched configuration file, the user interface that enables instant communications to be rendered on the output device;
  allow communications between the first instant messaging user interface and a first server having an instant messaging gateway service;
  send first instructions from the first server to a second server, the first instructions establishing an anonymous instant messenger account for a first user using the first instant messaging user interface; and
  send a request to a web-based instant messaging server, the request initiating an instant messaging session with a second instant messaging user interface, the request requiring a permission to receive presence information of the first user using the first instant messaging user interface;
  determine if a second user is using the second instant messaging user interface;
  responsive to determining that the second user is using the second instant messaging user interface, send a prompt to the second user to respond to the request; and
  assign a unique identifier to the first client using a hash algorithm, the unique identifier stored on the web-based instant messaging server.

18. The system of claim 17 wherein the configuration file is fetched from the server remote from the system.

19. The system of claim 17 wherein the configuration file comprises information identifying the webpage.

20. A computer-implemented method, comprising:
  loading a webpage including software code embedded in the webpage, the software code including data describing a location in a configuration server that stores a configuration file;
  fetching, based at least in part on the location included in the software code, the configuration file that includes one or more design parameters from the configuration server in response to the software code being executed due to loading of the webpage, the one or more design parameters including data for generating a presence element that indicates a status of an owner of a widget related to a first instant messaging user interface;
  rendering the first instant messaging user interface on the webpage using the fetched configuration file;
  allowing communications between the first instant messaging user interface and a first server having an instant messaging gateway service;
  sending first instructions from the first server to a second server, the first instructions establishing an anonymous instant messenger account for a first user using the first instant messaging user interface;

sending a request to a web-based instant messaging server, the request initiating an instant messaging session with a second instant messaging user interface, the request requiring a permission to receive presence information of the first user using the first instant messaging user interface;

determining if a second user is using the second instant messaging user interface;

responsive to determining that the second user is using the second instant messaging user interface, sending a prompt to the second user to respond to the request; and storing, in a cookie, an alias for the first user.

21. The computer-implemented method of claim 20, further comprising determining if a second user is using the second instant messaging user interface.

22. The computer-implemented method of claim 21, further comprising prompting the second user to respond to the request.

23. The computer-implemented method of claim 22, wherein the first server and the second server communicate to maintain a real-time instant messaging session between the first user and the second user.

24. The computer-implemented method of claim 23, wherein status information for the first user and the second user is dynamically updated.

25. The computer-implemented method of claim 23, wherein the second instant messaging user interface indicates a location of the first instant messaging user interface on a network.

26. The computer-implemented method of claim 21, wherein the first instant messaging user interface is designed by the second user.

27. The computer-implemented method of claim 21, wherein the software code is automatically generated in response to the one or more design parameters provided by the second user.

28. A non-transitory computer-readable storage medium having stored thereon a plurality of instructions, said plurality of instructions when executed by a computer, cause said computer to perform:

loading a webpage including software code embedded in the webpage, the software code including data describing a location in a configuration server that stores a configuration file;

fetching, based at least in part on the location included in the software code, the configuration file that includes one or more design parameters from the configuration server in response to the software code being executed due to loading of the webpage, the one or more design parameters including data for generating a presence element that indicates a status of an owner of a widget related to a first instant messaging user interface;

rendering the first instant messaging user interface on the webpage using the fetched configuration file;

allowing communications between the first instant messaging user interface and a first server having an instant messaging gateway service;

sending first instructions from the first server to a second server, the first instructions establishing an anonymous instant messenger account for a first user using the first instant messaging user interface; and sending a request to a web-based instant messaging server, the request initiating an instant messaging session with a second instant messaging user interface, the request requiring a permission to receive presence information of the first user using the first instant messaging user interface;

determining if a second user is using the second instant messaging user interface;

responsive to determining that the second user is using the second instant messaging user interface, sending a prompt to the second user to respond to the request; and assigning a unique identifier to the first client using a hash algorithm, the unique identifier stored on the web-based instant messaging server.

29. The non-transitory computer-readable storage medium of claim 28, having stored thereon-additional instructions, said additional instructions when executed by the computer, cause said computer to further perform determining if a second user is using the second instant messaging user interface.

30. The non-transitory computer-readable storage medium of claim 29, having stored thereon-additional instructions, said additional instructions when executed by the computer, cause said computer to further perform prompting the second user to respond to the request.

31. The non-transitory computer-readable storage medium of claim 30, wherein the first server and the second server communicate to maintain a real-time instant messaging session between the first user and the second user.

32. The non-transitory computer-readable storage medium of claim 31, wherein status information for the first user and the second user is dynamically updated.

33. The non-transitory computer-readable storage medium of claim 32, wherein the second instant messaging user interface indicates a location of the first instant messaging user interface on a network.

34. The non-transitory computer-readable storage medium of claim 29, wherein the first instant messaging user interface is designed by the second user.

35. The non-transitory computer-readable storage medium of claim 29, wherein the software code is automatically generated in response to the one or more design parameters provided by the second user.

36. A system comprising:
one or more processors; and
an output module, stored on a memory and executable by the one or more processors;
wherein the one or more processors is configured to:
load a webpage and software code embedded in the webpage, the software code including data describing a location in a server that stores a configuration file;
fetch, based at least in part on the location included in the software code, the configuration file that includes one or more design parameters as a result of execution of the software code due to loading the webpage, the one or more design parameters including data for generating a presence element that indicates a status of an owner of a widget related to a first instant messaging user interface;
cause the webpage to be rendered on the output device; and
cause, using the fetched configuration file, the user interface that enables instant communications to be rendered on the output device;
allow communications between the first instant messaging user interface and a first server having an instant messaging gateway service;
send first instructions from the first server to a second server, the first instructions establishing an anonymous instant messenger account for a first user using the first instant messaging user interface; and
send a request to a web-based instant messaging server, the request initiating an instant messaging session with a second instant messaging user interface, the request requiring a permission to receive presence information of the first user using the first instant messaging user interface;

determine if a second user is using the second instant messaging user interface;

responsive to determining that the second user is using the second instant messaging user interface, send a prompt to the second user to respond to the request; and assign a unique identifier to the first client using a hash algorithm, the unique identifier stored on the web-based instant messaging server.

37. The system of claim 36 wherein the configuration file is fetched from the server remote from the system.

38. The system of claim 37 wherein the configuration file comprises information identifying the webpage.

* * * * *